Dec. 5 1950     F. J. MARTIN     2,533,129
DITCH BANK DISK PLOW
Filed May 10, 1948     3 Sheets-Sheet 1
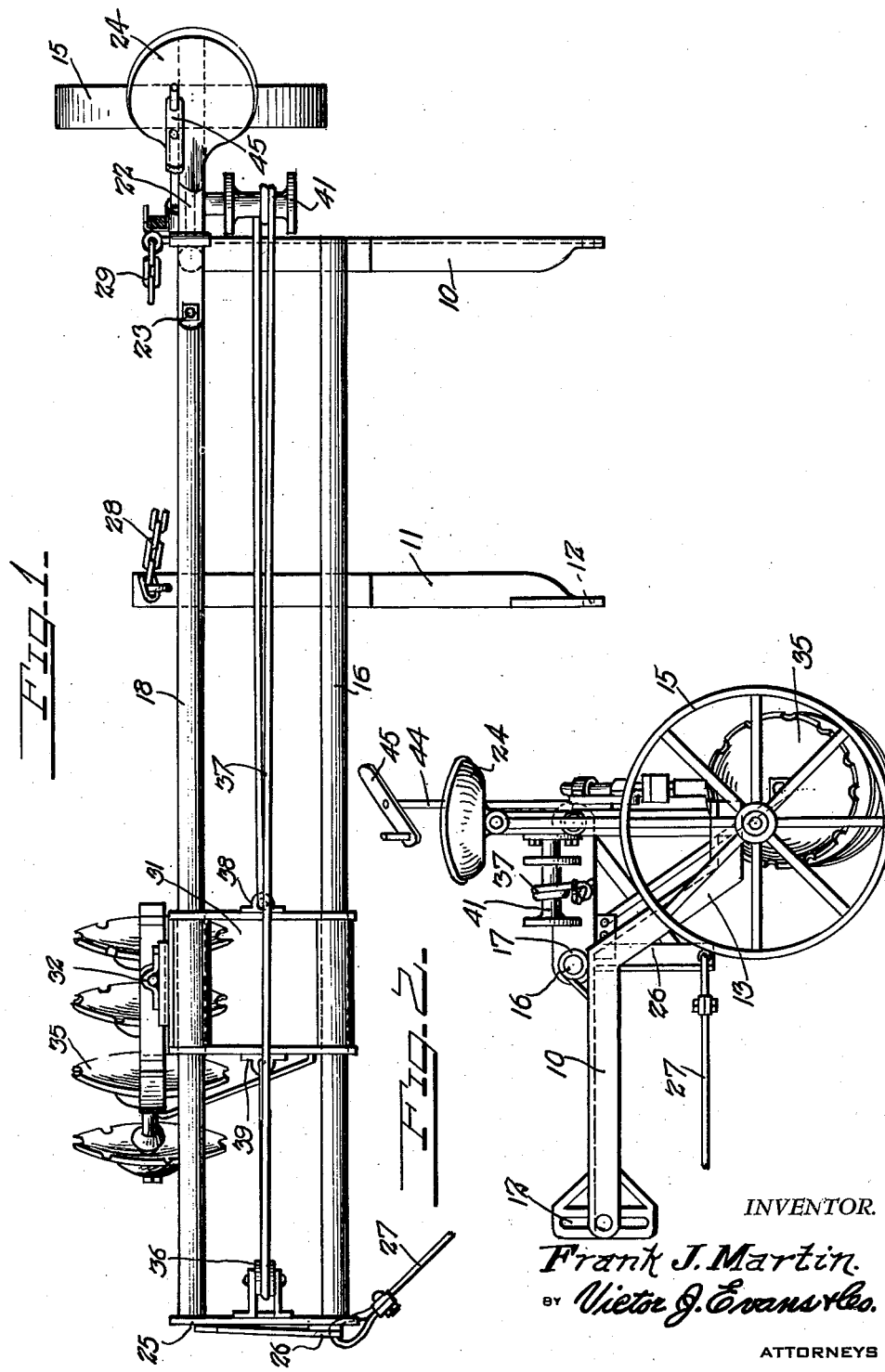
INVENTOR.
Frank J. Martin.
BY Victor J. Evans & Co.
ATTORNEYS Dec. 5 1950 F. J. MARTIN 2,533,129
DITCH BANK DISK PLOW
Filed May 10, 1948 3 Sheets-Sheet 2
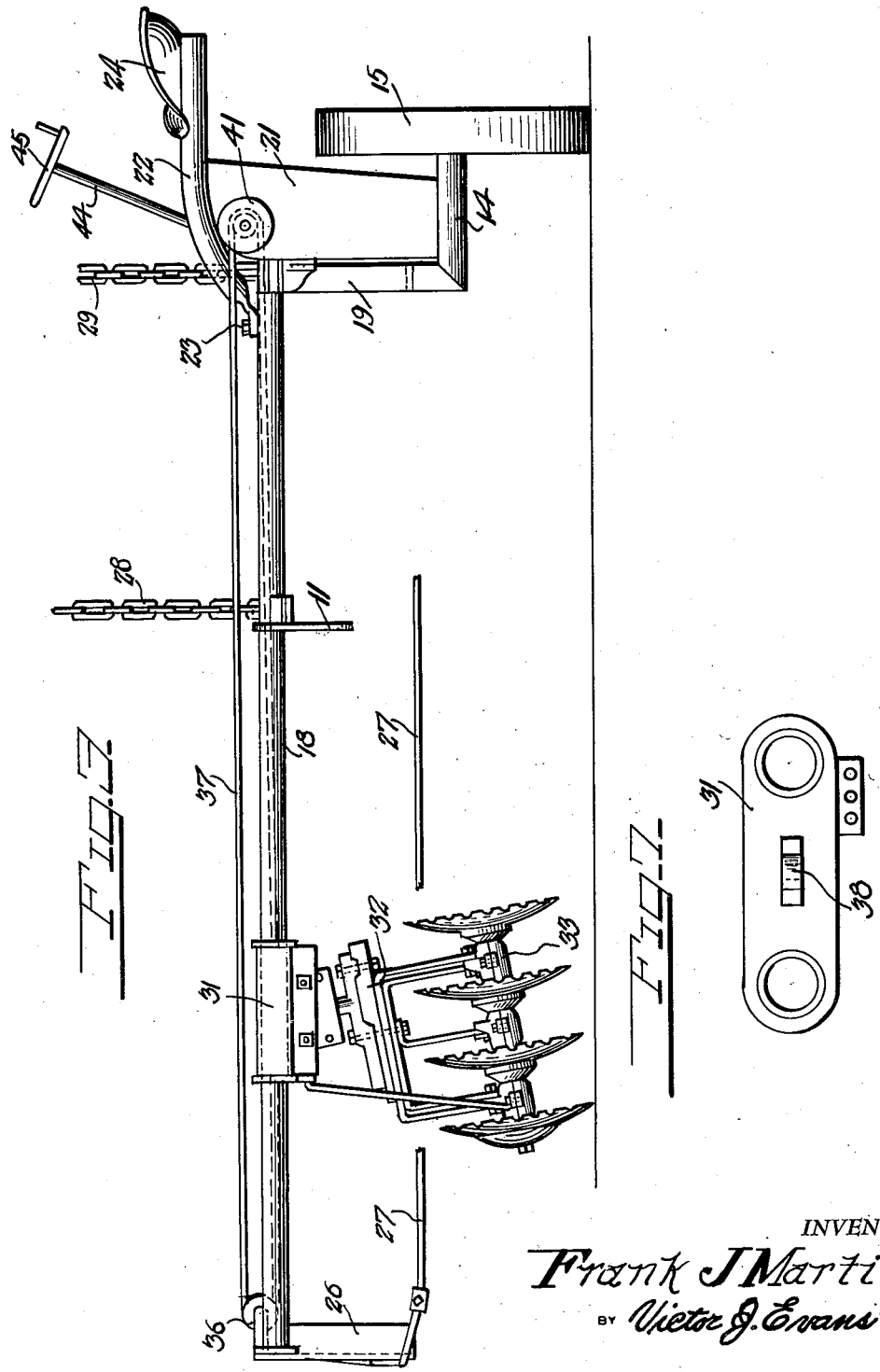
INVENTOR.
Frank J Martin.
BY Victor J. Evans & Co.
ATTORNEYS Dec. 5 1950 F. J. MARTIN 2,533,129
DITCH BANK DISK PLOW
Filed May 10, 1948 3 Sheets-Sheet 3
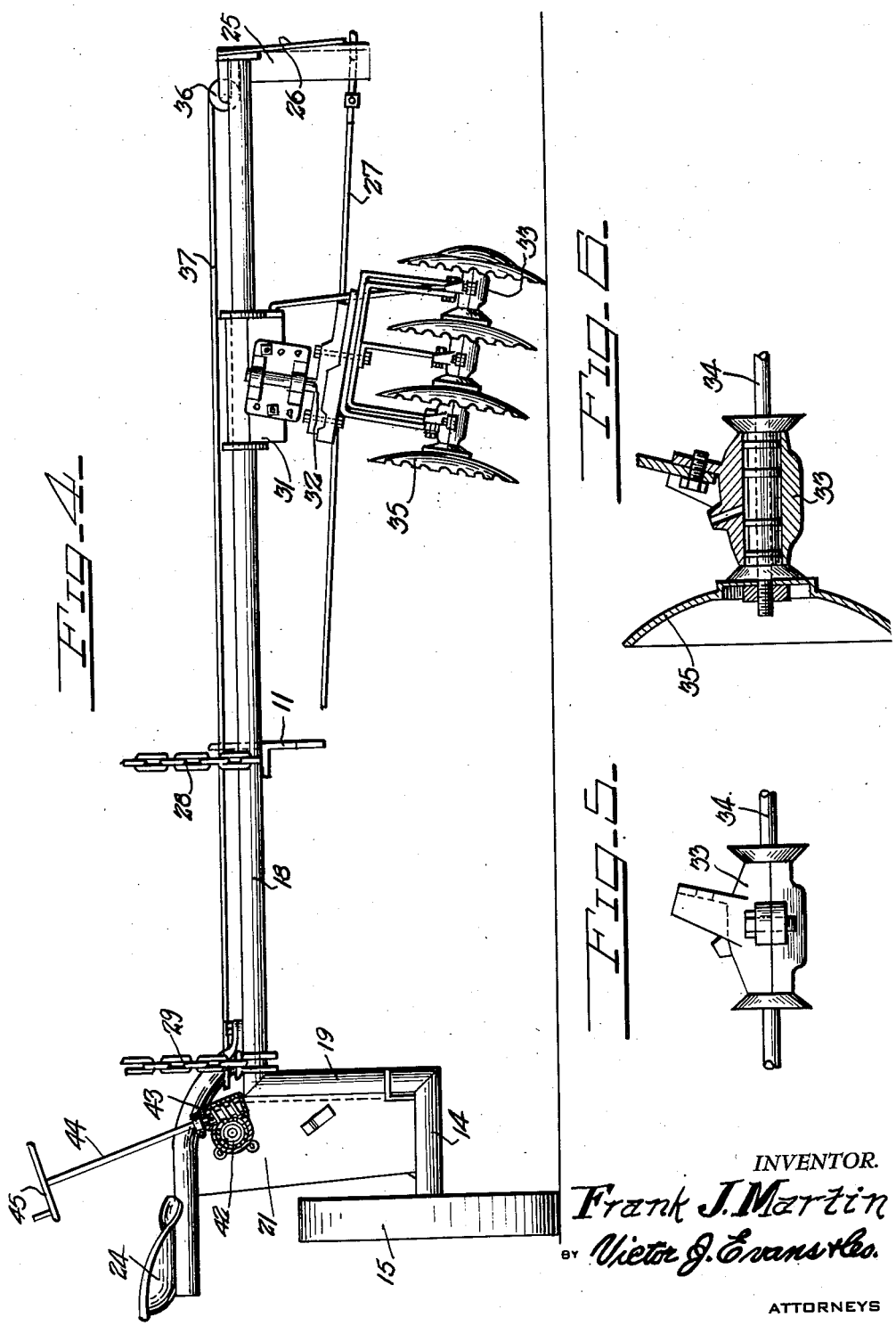
INVENTOR.
Frank J. Martin
BY Victor J. Evans & Co.
ATTORNEYS Patented Dec. 5, 1950

2,533,129

UNITED STATES PATENT OFFICE 2,533,129

DITCHBANK DISK PLOW

Frank J. Martin, Franklin, La.

Application May 10, 1948, Serial No. 26,052

3 Claims. (Cl. 97—53)

This invention relates to a ditch bank plow adapted to be directly connected to a tractor.

It is an object of the present invention to provide a ditch bank plow having a disk gang mounted for lateral adjustment along laterally extending supporting beams and wherein there is an operator's station at one side of the implement adjacent to a crank for effecting the lateral adjustment of the disk gang along the implement and wherein ditch banks at a variable distance from the tractor can be at all times properly reached by the adjustment of the disk gang along the implement.

Other objects of the present invention are to provide a ditch bank plow for tractors which is of simple construction, easy to connect to the tractor, inexpensive to manufacture, easy to adjust and efficient in operation.

For other objects and for a better understanding of the invention, reference may be had to the following detailed description taken in connection with the accompanying drawing, in which Fig. 1 is a top plan view of the ditch bank plow embodying the features of the present invention.

Fig. 2 is a side elevational view.

Fig. 3 is a front elevational view.

Fig. 4 is a rear elevational view.

Fig. 5 is an elevational view of one of the disk gang supporting brackets.

Fig. 6 is a longitudinal sectional view taken through one of the disk gang brackets.

Fig. 7 is an end elevational view of the slide.

Referring now to the figures, 10 and 11 represent respectively laterally spaced draft elements adapted to be connected at their forward ends to a tractor. On the element 11 is a vertically extending slot 12 which permits the element to be adjusted up and down on the tractor. The element 10 has a depending portion 13 to which is connected a transverse sleeve 14, Fig. 3, for the connection of a ground supporting wheel 15 therewith. A laterally extending guide or arm 16 is connected to the upper edge of the draft element 10 by welding as indicated at 17, Fig. 2. Rearwardly of the guide arm 16 is a parallel guide arm 18 which extends outwardly to the same distance as the arm 16.

To the inner end of the arm 18 there is connected to depend downwardly, a pipe extension 19 to which the wheel sleeve 14 is integrally connected. A brace 21 extends upwardly from the wheel sleeve over which is supported a seat arm 22 connected to the rear guide arm by a bolt 23 and extending over the wheel 15 to support a seat 24.

The outer ends of the arms 16 and 18 are connected together by a plate 25 from which depends an arm 26 to which a cable 27 is connected. The cable 27 will extend forwardly to the side of the tractor.

The draft element 11 is rigidly connected to the arms 16 and 18 and the same extends rearwardly of the guide arm 18 to support a chain 28. A chain 29 may be connected to the rear guide arm 18 as shown in Fig. 4. These chains 28 and 29 may serve to lift the implement or to connect other implements thereto.

Adjustable along the guide arms 16 and 18 is a slide 31 to which is adjustably connected brackets 32 and disk gang bearings 33 supporting a disk gang shaft 34 having disk gangs 35 thereon. On the plate 25 is a pulley 36 over which is extended a cable 37 having its ends connected as indicated at 38 and 39 to opposite ends of the slide 31. This cable 37 extends about a spool 41 located adjacent the seat 24 and adapted to be rotated by gear 42 extending from the side of the brace 21, a worm 43 meshing with the gear 42 and from which extends a shaft 44 having a crank wheel 45 thereon. The crank wheel lies adjacent the seat 24 so that the operator can easily manipulate the same as the tractor with the implement is proceeding along the ditch bank.

While various changes may be made in the detail construction, it shall be understood that such changes shall be within the spirit and scope of the present invention as defined by the appended claims.

I claim:

1. A ditch bank plow comprising laterally spaced draft elements, one of said draft elements having a depending portion, a forward guide arm laterally extending across the draft elements and rigidly secured thereto, a rear guide arm rearwardly spaced from the forward guide arm extending laterally and rigidly connected to one of the draft elements, the other draft element having a depending portion, the rearward guide arm having an integral depending portion and a lateral portion extending from the depending portion, said depending portion of the other draft element rigidly connected to the depending portion of the rear guide arm, a wheel connected to the portion of the guide arm extending from the depending portion of the same, an operator's station connected to the rear guide arm and extending over the supporting wheel, a slide adjustable on the guide arms, a disk gang connected to the slide, and mechanism connected to the slide and operable from the operator's station for effecting the adjustment of the slide and gang on the guide arm.

2. A ditch bank plow comprising laterally spaced draft elements, one of said draft elements having a depending portion, a forward guide arm laterally extending across the draft elements and rigidly secured thereto, a rear guide arm rearwardly spaced from the forward guide arm extending laterally and rigidly connected to one of the draft elements, the other draft element having a depending portion, the rearward guide arm having an integral depending portion and a lateral portion extending from the depending portion, said depending portion of the other draft element rigidly connected to the depending portion of the rear guide arm, a wheel connected to the portion of the guide arm extending from the depending portion of the same, an operator's station connected to the rear guide arm and extending over the supporting wheel, a slide adjustable on the guide arms, a disk gang connected to the slide, and mechanism connected to the slide and operable from the operator's station for effecting the adjustment of the slide and gang on the guide arm, and a brace support extending upwardly from the lateral portion on the depending portion of the rear guide arm and adapted to support the operator's station, said mechanism for adjusting the slide comprising a spool journalled on the brace support, a gear connected to the spool, an operating shaft having a gear meshing with the gear on the spool and having a handle extending to a location near the operator's station, a pulley device connected to the outer ends of the guide arms, and a cable connected between the pulley and the spool and connected to the slide.

3. A ditch bank plow as in claim 1 wherein a plate is provided for connecting the outer ends of the guide arms together and the mechanism connected to the slide and operable from the operator's station for effecting the adjustment of the slide and gang on the guide arm, comprises a pulley on said plate, a spool adjacent the operator's station operating mechanism for rotating said spool and a cable extending between the pulley and the spool and connected to the opposite ends of the slide.

FRANK J. MARTIN.

REFERENCES CITED

The following references are of record in the file of this patent:

UNITED STATES PATENTS

| Number | Name | Date |
|---|---|---|
| 820,635 | Fox | May 15, 1906 |
| 1,256,404 | Watts | Feb. 12, 1918 |
| 2,269,344 | Nelson | Jan. 6, 1942 |

FOREIGN PATENTS

| Number | Country | Date |
|---|---|---|
| 649,502 | France | Sept. 3, 1928 |